Oct. 18, 1932.　　　　M. ESTOCK　　　　1,883,656

IRRIGATION NOZZLE

Filed Aug. 13, 1930

Inventor
Michael Estock
By
Attorney

Patented Oct. 18, 1932

1,883,656

UNITED STATES PATENT OFFICE

MICHAEL ESTOCK, OF ORANGE, CALIFORNIA

IRRIGATION NOZZLE

Application filed August 13, 1930. Serial No. 475,062.

The present invention is an irrigation nozzle useful in irrigating flowering plants, shrubs, garden vegetables, fruit trees and the like, the nozzle being attachable to hose or other pipe connections which convey water for irrigating purposes.

Nozzles now in present use and attachable to hose or pipe systems are usually of either the sprinkling or water deflecting type which spray the foliage of the plants and which by the force of the spray pack the ground about the plant. To irrigate the roots of the plants with hose or a pipe system without nozzles, the pressure of the water, (which is usually high) is sufficient to wash away the soil from the fine surface roots of the plants, and to wash holes at the base of the plants or shrubs thus weakening them.

The object of the present invention is the provision of a nozzle which will irrigate the plants without splashing or sprinkling the foliage or buds, and which breaks the force of the direct flow of the water without diminishing its volume, and delivers it very gently to the roots or base of the plants or vegetation being irrigated. Thus all of the drawbacks mentioned above are eliminated, thereby protecting the plants, wasting no water, and saving time.

It is a further object of the present invention to provide a nozzle of the above stated character of a very simple construction, economical to manufacture, durable and efficient in operation.

Other objects of this invention will in part be obvious and in part hereinafter pointed out.

With the above and other objects in view, the invention resides in the sundry details of construction, combination and arrangement of parts, which will be exemplified in the construction hereinafter described and in the appended claims.

Referring to the drawing which shows the preferred embodiment of the invention as at present devised:

Figure 1:
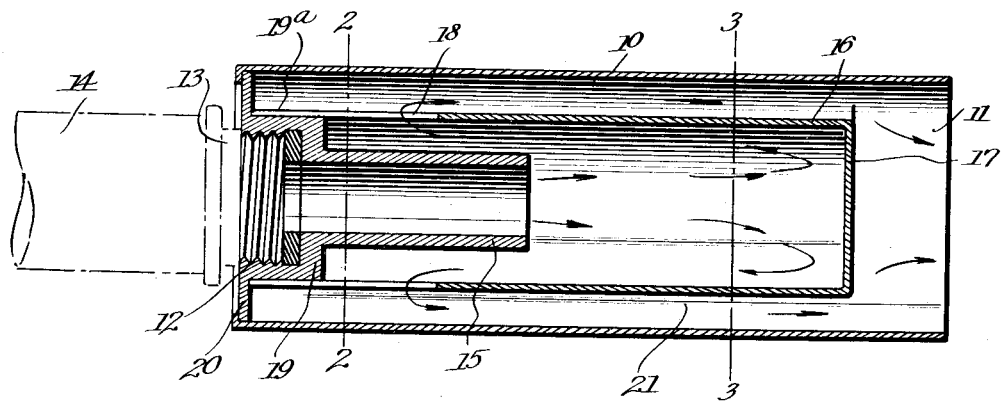
Figure 1 is a longitudinal sectional view taken through the nozzle shown attached to the end of a hose.
Figure 2:
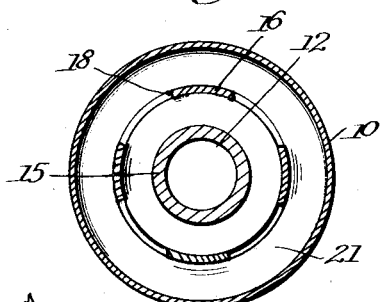
Figure 2 is a transverse sectional view of a nozzle taken on line 2—2 of Figure 1.
Figure 3:
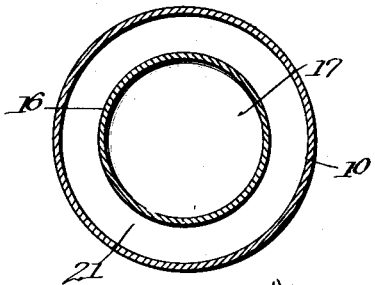
Figure 3 is a transverse sectional view taken on line 3—3 of Figure 1.
Figure 4:
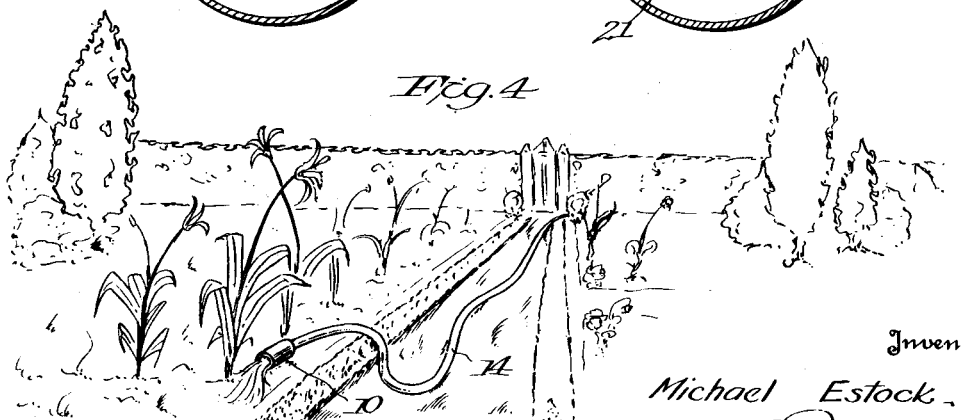
Figure 4 is a perspective view of the device illustrating one of its uses.

Broadly considered, the present invention consists of an irrigating nozzle attachable to a pipe or hose connection, having baffles therein for diverting or reversing the flow of the water, including a plurality of passages whose cross-sectional area is progressively greater than its intake opening, and having a discharge orifice of greater area than said passages whereby the pressure of the water flowing into the nozzle may be reduced and the force of the flow broken up before discharging therefrom without diminishing the volume of the flow.

Referring in detail to the drawing, where one form of the invention is shown, the nozzle consists of an elongated tubular shell 10, opened at one end 11 to the full extent of its cross-sectional area, and having a reduced intake opening 12 at its other end which is preferably internally threaded to receive the threaded end or fitting 13 of a pipe, hose or the like, 14. Extending inwardly from the intake opening 12 for a substantial distance and longitudinally of the tubular shell 10 is a tubular extension 15. The interior diameter of the tubular extension 15 is preferably the same as that of the pipe 14, or substantially so.

Between the tubular extension 15 and the tubular shell 10 is disposed an elongated tubular baffle member 16, which is of greater cross-sectional diameter than the tubular extension 15, and less than the outer shell 10. This baffle member 16 is positioned to extend longitudinally of the shell 10, and is held in position at the inner or inlet end of the nozzle and is closed at its outer end 17. This baffle member is preferably of less length than the outer shell 10, but of greater length than the tubular extension 15. The inner end portion of the baffle 16 is formed about its perimeter with a plurality of spaced openings, preferably in the form of elongated longitudinal slots 18, which communicate the interior of the baffle with the interior of the outer tubular shell 10 at the rear portion of the nozzle.

The nozzle may be made in any suitable or desired manner, such as a casting, or may be made from a plurality of parts fitted or connected together, or it may be made of sheet metal.

In the present disclosure, the outer shell 10 may be made, as shown, of heavy gaged sheet metal closed at its inner end by a cast fitting 19, in which the threaded opening 12 is formed, the fitting having a circumferential flange 20 to which the inner end of the shell is suitably connected, such as by crimping, rolling, welding or the like. The tubular extension 15 is shown as an integral part of the fitting 19. The interior baffle 16 is also shown as of sheet metal in tubular form, closed at its outer end, and having its inner end provided with a plurality of longitudinal slots 18, extending inwardly from the edge of said inner end. The fingers produced between these slots are secured to the outer sides of the bossed surface 19a of the fitting 19 by any suitable means such as screws or other fastening means. However, in the present instance they are shown as being spot welding. The bossed surface 19a describes a perimetrical line between the outer shell 10 and the tubular extension 15 so as to maintain the baffle in spaced relation between these parts.

While the nozzle of the present invention may be made in any desired size, and the relative size of the individual parts above described may be varied from the present showing, as desired, without departing from the scope of the present invention, in order to define a size of a nozzle which has been found to be efficient, it may be stated that the outer shell 10 may be 5½ inches long and 1⅞ inches in diameter; the baffle tube 4½ inches long and 1¼ inches in diameter with the slots 18, 1⅛ inches long and 1/16 of an inch wide; while the tubular extension 15, may be 1⅝ inches long and ⅝ of an inch in interior diameter.

The irrigation nozzle above described is designed to be laid upon the ground adjacent to plants and other objects to be irrigated, and when connected with a high pressure water system, the water flows through the extension 15 and strikes the closed end 17 of the tubular baffle 16, and is forced back into the passage between the tubular extension 15 and the baffle 16 from where it flows through the openings 18, and then flows through the passage 21 between the baffle 16 and the outer shell 10 to an enlarged discharge orifice 11 onto the ground where it gently flows and spreads over the ground surface. The construction of the nozzle is such by the arrangement of its parts that the pressure of the water has been reduced to a greater extent than if it flowed directly from the hose or pipe connection 14; thereby eliminating the objectionable washing of dirt from the roots of the plants, washing holes in the earth, and causing a spray or splash on the foliage.

This nozzle is designed to be laid on the ground or in some instances may be submerged into the ground with the discharge end opened at the surface of the ground, and several of these nozzles may be interposed in hose or pipe line by the use of T-joints or other suitable fittings.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

Having thus described the invention and the manner in which the same is to be performed, what is claimed as new and upon which Letters Patent is desired, is:

1. An irrigation nozzle including an outer shell, means at one end of said shell for attaching the nozzle to a source of water supply including an inlet opening, said shell having an enlarged discharge orifice, a tubular baffle within the shell receiving the water from said inlet opening and closed at the end portion remote from said opening, said tubular baffle being positioned to provide a passage between it and said shell and provided with an opening adjacent its other end portion of said baffle and a tubular projection extending from said inlet opening into said tubular baffle beyond said opening in the latter.

2. An irrigation nozzle including an outer shell, means at one end of said shell for attaching the nozzle to a source of water supply including an inlet opening, said shell having an enlarged discharge orifice, means within said shell and located near said discharge orifice against which the incoming flow of water to the nozzle impinges, breaking the pressure thereof, said means being disposed with respect to the shell to provide a passage between it and the shell through which the water flows to said discharge orifice.

3. An irrigation nozzle including an outer shell, means at one end of said shell for attaching the nozzle to a source of water supply including an inlet opening, said shell having an enlarged discharge orifice, means within said shell and located near said discharge orifice against which the incoming flow of water to the nozzle impinges, said means reversing the flow of water in the nozzle and breaking the pressure thereof, said means being disposed with respect to the shell to provide a passage between it and the shell through which the water flows to said discharge orifice.

4. An irrigation nozzle comprising an outer elongated tubular shell having an inlet opening at one end and a discharge opening at the other end of greater area than said inlet, means at said inlet opening for attaching the nozzle to a source of supply, a tubular extension projecting for a distance inwardly of the shell from said inlet, a tubular baffle of greater cross-sectional area than said extension and of less than said shell longitudinally positioned within said shell and surrounding said extension, means for holding said baffle in position spaced from said shell, said baffle having its end near the end of the discharge end of nozzle closed and spaced from the discharge end of said extension, the interior of said baffle communicating with said shell at a point in back of the discharge end of said extension.

5. A device for breaking down the velocity of a jet of liquid from a source under pressure and including an outer shell, an unobstructed inlet fitting for attachment to said source, and a jet obstruction means fixed in the shell and in the path of the jet to wholly break the velocity of the jet; said shell having an outlet.

6. A nozzle for breaking down the velocity of jet of liquid from a source of supply and including a shell having inlet means for attachment to a source of supply and having at its opposite end an outlet, and a cup-shaped obstruction fixed in the shell with its open side toward and coaxial with the inlet of said means and forming a clearance for passage of the water after it is intercepted; whereby the checked water accumulates as a cushion in the jet path.

7. A nozzle for breaking down the velocity of jet of liquid from a source of supply including a shell having inlet means for attachment to a source of supply and having at its opposite end an outlet, and a cup-shaped obstruction fixed in the shell with its open side toward and coaxial with the inlet of said means, the rim of said obstruction being connected to said inlet means by a set of spaced arms forming water flow spaces to the chamber of the shell, the cup being held in concentric relation to the shell, whereby the checked water accumulates as a cushion in the jet path.

8. An irrigation nozzle including an outer shell, means at one end of said shell for attaching the nozzle to a source of water supply including an inlet opening, said shell having a discharge orifice of greater cross-sectional area than said inlet opening, means within said shell and located near said discharge orifice against which the incoming flow of water to the nozzle impinges, breaking the pressure thereof, said means being disposed with respect to the shell to provide a passage between it and the shell through which the water flows to said discharge orifice.

In testimony whereof I have hereunto set my hand.

MICHAEL ESTOCK.